United States Patent
Xu et al.

(10) Patent No.: US 11,470,630 B2
(45) Date of Patent: Oct. 11, 2022

(54) METHOD AND SYSTEM FOR UPGRADING CPE FIRMWARE

(71) Applicant: ZTE Corporation, Shenzhen (CN)

(72) Inventors: Hui Xu, Shenzhen (CN); Chen Lu, Shenzhen (CN); Jianfeng Ding, Shenzhen (CN); Xiangmo Zhao, Shenzhen (CN); Fei Hui, Shenzhen (CN); Zhongwei Ji, Shenzhen (CN); Zijiang Ma, Shenzhen (CN); Yaying Wang, Shenzhen (CN); Xiaoquan Hua, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/971,079

(22) PCT Filed: Jan. 31, 2019

(86) PCT No.: PCT/CN2019/074102
§ 371 (c)(1),
(2) Date: Aug. 19, 2020

(87) PCT Pub. No.: WO2019/196553
PCT Pub. Date: Oct. 17, 2019

(65) Prior Publication Data
US 2020/0396756 A1    Dec. 17, 2020

(30) Foreign Application Priority Data

Apr. 10, 2018    (CN) .......................... 201810317836.2

(51) Int. Cl.
*H04W 72/12*    (2009.01)
*H04W 4/40*    (2018.01)
*H04W 24/08*    (2009.01)
*H04W 48/18*    (2009.01)
*H04W 72/02*    (2009.01)
*H04W 72/04*    (2009.01)
(Continued)

(52) U.S. Cl.
CPC ......... *H04W 72/1273* (2013.01); *H04W 4/40* (2018.02); *H04W 24/08* (2013.01);
(Continued)

(58) Field of Classification Search
CPC ... H04W 72/1273; H04W 4/40; H04W 24/08; H04W 48/18; H04W 72/02;
(Continued)

(56) References Cited

U.S. PATENT DOCUMENTS

2018/0220425 A1* 8/2018 Zhang ............... H04W 72/0453
2018/0376304 A1* 12/2018 Cheng .................... H04W 4/44
(Continued)

FOREIGN PATENT DOCUMENTS

CN    107040960 A    8/2017
CN    107295644 A    10/2017
(Continued)

OTHER PUBLICATIONS

International Search Report for corresponding application PCT/CN2019/074102 filed Jan. 31, 2019; dated Apr. 16, 2019.
(Continued)

*Primary Examiner* — Chae S Lee
(74) *Attorney, Agent, or Firm* — Cantor Colburn LLP

(57) ABSTRACT

The present disclosure provides service sending and receiving methods and devices, and a storage medium. The method includes that: a sending technology corresponding to a service to be sent is determined, where the sending technology at least includes the first sending technology and the second sending technology which correspond to different versions of receiving User Equipment (UE) respectively; and a sending resource corresponding to the sending technology is determined, and the service to be sent is sent on the determined sending resource.

13 Claims, 8 Drawing Sheets

(51) Int. Cl.
    *H04W 74/08*     (2009.01)
    *H04W 92/18*     (2009.01)

(52) U.S. Cl.
    CPC ........... *H04W 48/18* (2013.01); *H04W 72/02* (2013.01); *H04W 72/048* (2013.01); *H04W 72/121* (2013.01); *H04W 72/1252* (2013.01); *H04W 74/0808* (2013.01); *H04W 92/18* (2013.01)

(58) Field of Classification Search
    CPC ............. H04W 72/048; H04W 72/121; H04W 72/1252; H04W 74/0808; H04W 92/18
    See application file for complete search history.

(56) References Cited

U.S. PATENT DOCUMENTS

2020/0383114 A1* 12/2020 Zhang ................... H04L 5/0096
2021/0051628 A1*  2/2021 Zhang ..................... H04W 8/24

FOREIGN PATENT DOCUMENTS

| CN | 107846434 A | 3/2018 |
| CN | 108770070 A | 11/2018 |
| WO | 2017133446 A1 | 8/2017 |

OTHER PUBLICATIONS

ZTE Corporation., "3GPP TSG RAN WG2 Meeting #101 R2-1801963", Discussion on Rel-14 and Rel-15 V2X Coexistence Issues, Feb. 14, 2018.

European Search Report for corresponding application EP 19 785 118 1; Report dated Feb. 26, 2021.

Fraunhofer HHI, "Resource Pool Sharing Between V2X Mode 3 and Mode 4 UEs", 3GPP TSG RAN WG1 Meeting #92bis, Sanya China Apr. 16-20, 2018, R11805248.

Oppo, "Mode 4 support in eV2X carrier aggregation", 3GPP TSG RAN WG1 Meeting #90bis, Prague, CZ Oct. 2017, R1-1718036.

* cited by examiner

METHOD AND SYSTEM FOR UPGRADING CPE FIRMWARE

CROSS-REFERENCE TO RELATED APPLICATIONS

The present application is filed based upon and claims priority to Chinese Patent Application No. 201810317836.2, filed on Apr. 10, 2018.

TECHNICAL FIELD

The present disclosure relates, but not limited, to the field of communication, and particularly to service sending methods and devices, and a storage medium.

BACKGROUND

A communication-based collision warning system implements real-time information interaction between vehicles and between a vehicle and a roadside infrastructure by use of advanced wireless communication technologies and new-generation information processing technologies to notify present states (including a position, speed, acceleration and drive route of the vehicle) and obtained road environment information to each other, so that the vehicles or the vehicle and the roadside infrastructure can cooperatively sense a dangerous road condition and timely provide many types of collision warning information to prevent occurrence of a traffic accident. This solution has become a novel idea for solving traffic safety problems throughout the country at present.

Vehicle to Everything (V2X) refers to providing vehicle information through sensors, vehicle terminals and electronic tags mounted in vehicles, implementing Vehicle to Vehicle (V2V), Vehicle to Pedestrian (V2P), Vehicle to Infrastructure (V2I) interconnection by various communication technologies and effectively utilizing, for example, extracting and sharing, information on an information network platform to effectively manage and control the vehicles and provide comprehensive service. FIG. 1 is a schematic diagram of V2X.

In a related art, a Long Term Evolution (LTE) technology is adopted for V2X-based communication applications.

A Road Side Unit (RSU) receives a request of a vehicle to ensure that the vehicle accesses the Internet, and has a function of a gateway. In addition, the RSU also has functions such as data operation, storage and forwarding.

In the related art, there are two V2X implementation technologies: Dedicated Short Range Communication (DSRC) and LTE. DSRC is based on a series of standards of IEEE802.11P and IEEE1609, in which IEEE 802.11P is responsible for physical-layer and Medium Access Control (MAC) technologies, and IEEE 1609 is responsible for upper-layer specifications. The LTE-based V2X technology is just started to be researched and there is yet no standard.

SUMMARY

In the related art, an RSU may be implemented by static User Equipment (UE) or Evolved Node B (eNB). However, the related art has the problems that low-version UE may not receive data sent by high-version UE because the low-version UE does not support a high-version technology and that, when a base station or sending UE simultaneously support the high-version technology but does not know a version capability of receiving UE, whether a high-version technical function may be adopted or not cannot be determined, etc. Consequently, UE of different versions may not cooperatively work, and the service transmission compatibility is low.

In view of this, embodiments of the present disclosure are intended to provide service sending and receiving methods and devices, and a storage medium, which may at least solve the problem of relatively low service transmission compatibility caused by the fact that UE of different versions may not cooperatively work in the related art.

The embodiments of the present disclosure provide a service sending method, which may include that: a sending technology corresponding to a service to be sent is determined, where the sending technology at least includes a first sending technology and a second sending technology which correspond to different versions of the receiving UE, respectively; and a sending resource corresponding to the sending technology is determined, and the service to be sent is sent on the determined sending resource.

The embodiments of the present disclosure also provide a service receiving method, which may include that: indication information is received, where the indication information includes at least one of a resource position for a service sent by sending UE and version indication information of receiving UE, the resource position is a resource determined after the sending UE determines a sending technology corresponding to the service to be sent, the resource corresponds to the sending technology, and the sending technology at least includes a first sending technology and a second sending technology which correspond to different versions of receiving the UE, respectively; and a resource pool is monitored according to the indication information to receive the service sent by the sending UE.

The embodiments of the present disclosure provide a service sending device, which may be applied to a sender and include: a processor configured to execute the following program modules: a determination module, configured to determine a sending technology corresponding to a service to be sent, where the sending technology at least includes a first sending technology and a second sending technology which correspond to different versions of receiving UE, respectively; and a processing module, configured to determine a sending resource corresponding to the sending technology and send the service to be sent on the determined sending resource.

The embodiments of the present disclosure also provide a service receiving device, which may be applied to a receiver and include: a first receiving module, configured to receive indication information, where the indication information includes at least one of a resource position for a service sent by sending UE and version indication information of receiving UE, the resource position is a resource determined after the sending UE determines a sending technology corresponding to the service to be sent, the resource corresponds to the sending technology, and the sending technology at least includes a first sending technology and a second sending technology which correspond to different versions of receiving UE, respectively; and a second receiving module, configured to monitor a resource pool according to the indication information to receive the service sent by the sending UE.

The embodiments of the present disclosure also provide a storage medium, in which a computer program may be stored, the computer program, when being executed, performs the service sending method provided in the embodiments of the present disclosure.

The embodiments of the present disclosure also provide a storage medium, in which a computer program may be stored, the computer program, when being executed, performs the service receiving method provided in the embodiments of the present disclosure.

The embodiments of the present disclosure also provide an electronic device, which may include a memory and a processor. A computer program may be stored in the memory. The processor may be configured to execute the computer program to perform the service sending method provided in the embodiments of the present disclosure.

The embodiments of the present disclosure also provide an electronic device, which may include a memory and a processor. A computer program may be stored in the memory. The processor may be configured to execute the computer program to perform the service receiving method provided in the embodiments of the present disclosure.

Through the embodiments of the present disclosure, the sending technology corresponding to the service to be sent is determined, where the sending technology at least includes the first sending technology and the second sending technology which correspond to different versions of the receiving UE, respectively; and the sending resource corresponding to the sending technology is determined, and the service to be sent is sent on the determined sending resource. That is, the service to be sent corresponds to the sending technology, so that the receiving UE may selectively receive the service according to whether the sending technology corresponds to the version of the receiving UE or not, the problem of relatively low service transmission compatibility caused by the fact that UE of different versions may not cooperatively work in the related art is solved, and the technical effect of improving the service transmission compatibility is achieved.

DETAILED DESCRIPTION OF THE EMBODIMENTS

The present disclosure will be described below with reference to the drawings and in combination with the embodiments in detail. It is to be noted that the embodiments in the application and characteristics in the embodiments may be combined without conflicts.

It is to be noted that the terms like "first" and "second" in the specification, claims and accompanying drawings of the present disclosure are used for differentiating the similar objects, but do not have to describe a specific order or a sequence.

Figure 1:
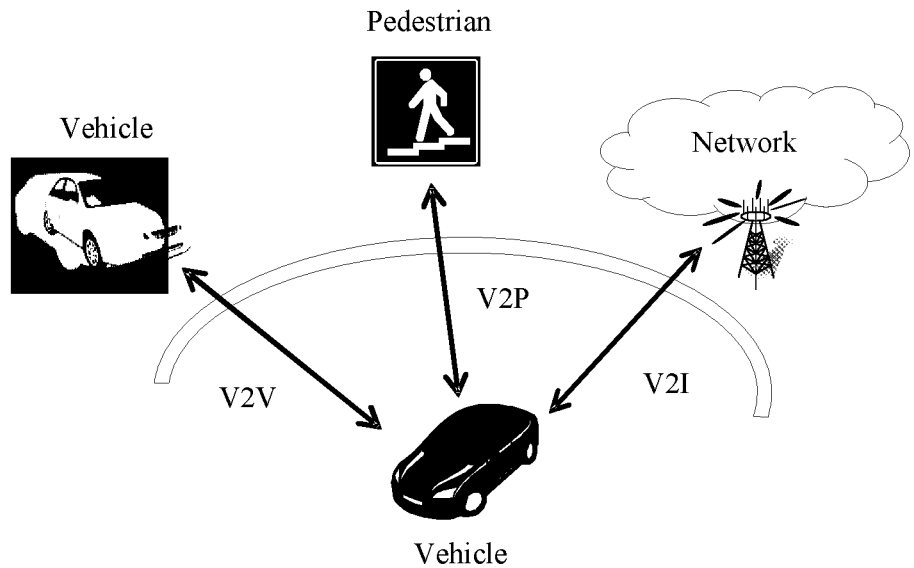
FIG. 1 is a schematic diagram of V2X according to the related art.
Figure 2:
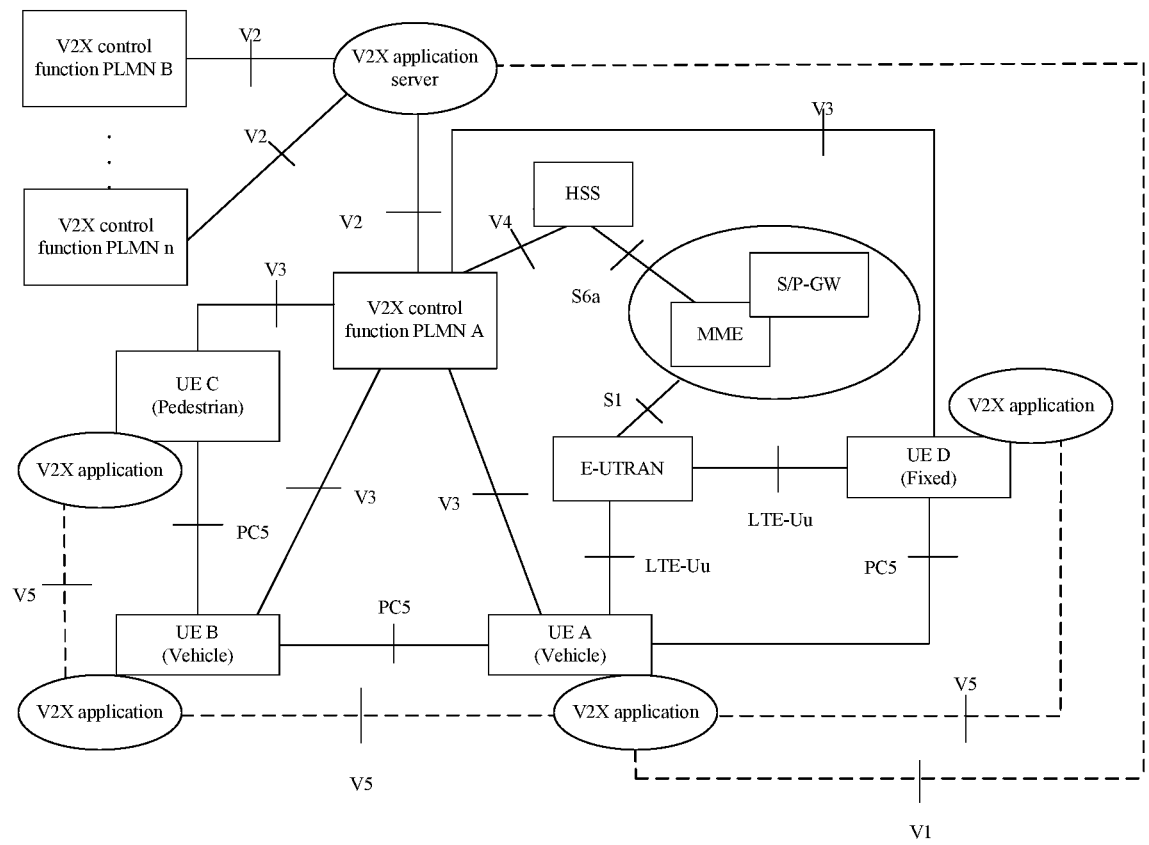
FIG. 2 is a system architecture for sending a V2X service through a PC5 interface according to the related art.

In the related art, an LTE V2X technology under discussion in the 3rd Generation Partnership Project (3GPP) includes that: an RSU may be implemented by static UE or eNB, and V2V/V2I/V2P may be implemented through a PC5 interface or a Uu interface, the PC5 interface referring to a Device to Device (D2D) air interface and the Uu interface referring to an air interface from the UE to the eNB. A system architecture for sending a V2X service through a PC5 interface is shown in FIG. 2.

In an LTE V2X topic under researching by the 3GPP, in a manner of independently selecting a resource by sending UE (mode 4), the UE selects a required PC5 interface sending resource in a sensing manner, and in case of Handover (HO), Radio Link Failure (RLF), resource pool changing and the like, an exceptional resource pool may be adopted. A pedestrian (P) in V2P usually does not have a PC5 receiving capability, namely the pedestrian may not select a resource in the sensing manner.

V2X information is safety related information and is usually not allowed to be discarded. If a network congestion occurs, it is necessary to select corresponding wireless transmission parameters for different congestion levels. For achieving this purpose, a congestion level of a channel is measured by a Channel Busy Ratio (CBR) in 3GPP. The CBR is defined as a ratio of the condition that sub channel energy in a resource pool exceeds a threshold value in a period of time (usually 100 ms), where the sub channel energy is identified with a Sidelink-Received Signal Strength Indication (S-RSSI) and the threshold value is determined in advance. UE measures and calculates a CBR according to a measurement configuration of a network side. For a given CBR, the network side provides a mapping table based on each V2X priority (a Proximity based Service (ProSe) Per-Packet Priority (PPPP) is adopted), where each table includes a CBR (usually a range) and a corresponding radio resource parameter, and the UE selects the corresponding radio resource parameter according to the CBR.

For convenient description, V-UE refers to Vehicle-UE and P-UE refers to Pedestrian-UE herein.

In the related art, two resource configuration methods may be adopted for a PC5 link in LTE V2X: a mode 3 and a mode 4. The mode 3 refers to that a base station configures a PC5 radio resource, and the mode 4 refers to that sending UE independently selects the PC5 radio resource. Resource pools of the mode 3 and the mode 4 are configured, respectively and may not overlap.

Researches on sharing of mode 3 resources and mode 4 resources is proposed in an Enhanced V2X (eV2X) topic in 3GPP Release-15 (R15), to increase the utilization rate of PC5 resources.

In addition, some new enhanced technologies are further proposed in the eV2X topic in R15, for example, Transmission Diversity (TxD), 64 Quadrature Amplitude Modulation (QAM) and Carrier Aggregation (CA).

In the related art, an RSU may be implemented by static UE or eNB. However, the related art has the problems that low-version UE may not receive data sent by high-version UE because the low-version UE does not support a high-version technology and that, when a base station or sending UE simultaneously support the high-version technology but does not know a version capability of receiving UE, whether a high-version technical function may be adopted or not cannot be determined, etc. Consequently, UE of different versions may not cooperatively work, and the service transmission compatibility is low.

Figure 3:
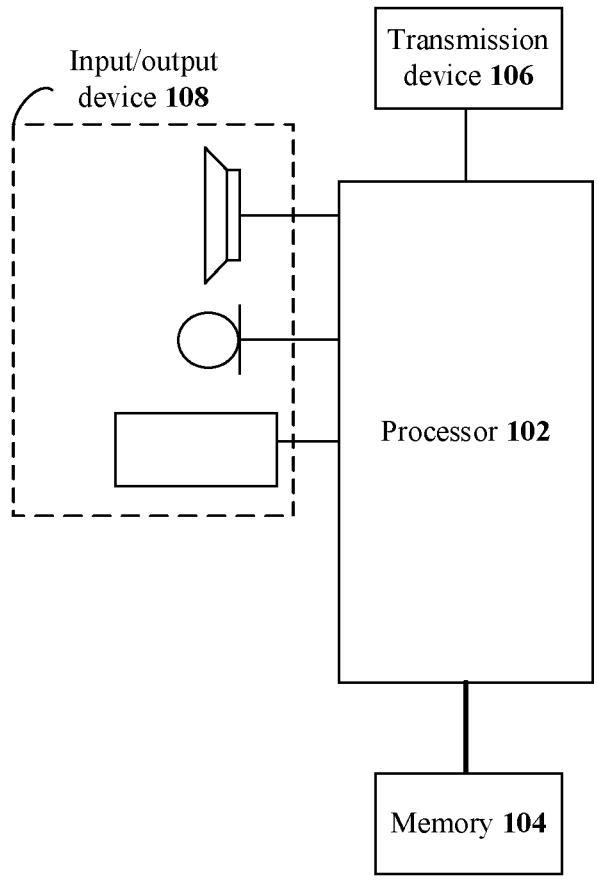
FIG. 3 is a hardware structure block diagram of a mobile terminal for a service sending method according to an embodiment of the present disclosure.

The method embodiment provided in the embodiments of the present application may be executed in a mobile terminal, a computer terminal or a similar arithmetic device. FIG. 3 is a hardware structure block diagram of a mobile terminal for a service sending method according to an embodiment of the present disclosure. For example, in case of being implemented in the mobile terminal, as shown in FIG. 3, the mobile terminal 10 may include one or more (only one is shown in FIG. 3) processors 102 (the processor 102 may include, but not limited to, a processing device such as a Micro Controller Unit (MCU) or a Field Programmable Gate Array (FPGA)) and a memory 104 configured to store data. In an embodiment, the mobile terminal may further include a transmission device 106 and input/output device 108 configured for a communication function. Those of ordinary skill in the art should know that the structure shown in FIG. 3 is only schematic and not intended to limit the structure of the mobile terminal. For example, the mobile terminal 10 may further include components more or fewer than those shown in FIG. 3 or adopts a configuration different from that shown in FIG. 3.

The memory 104 may be configured to store a computer program like a software program of application software and a module, for example, a computer program corresponding to the service sending method in the embodiments of the present disclosure. The processor 102 executes the computer program stored in the memory 104, thereby executing various functional applications and data processing, namely implementing the abovementioned method. The memory 104 may include a high-speed Random Access Memory (RAM) and may further include a nonvolatile memory, for example, one or more magnetic storage devices, flash memories or other nonvolatile solid-state memories. In some examples, the memory 104 may further include a memory arranged remotely relative to the processor 102 and the remote memory may be connected to the mobile terminal 10 through a network. Examples of the network include, but not limited to, the Internet, an intranet of an enterprise, a local area network, a mobile communication network and a combination thereof.

The transmission device 106 is configured to receive or send data through a network. An example of the network may include a wireless network provided by a communication provider of the mobile terminal 10. In an example, the transmission device 106 includes a Network Interface Controller (NIC), which may be connected with another network device through a base station, thereby communicating with the Internet. In an example, the transmission device 106 may be a Radio Frequency (RF) module, configured to communicate with the Internet in a wireless manner.

Figure 4:
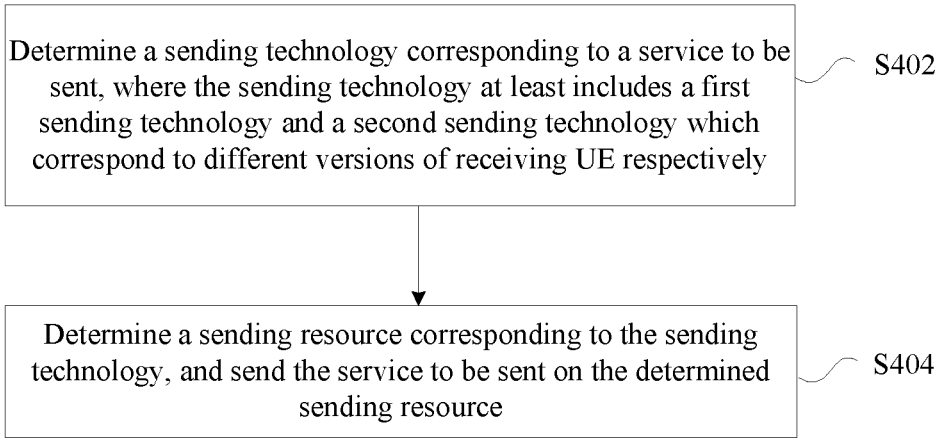
FIG. 4 is a flowchart of a service sending method according to an embodiment of the present disclosure.

The embodiments provide a service sending method implemented in the abovementioned mobile terminal. FIG. 4 is a flowchart of a service sending method according to an embodiment of the present disclosure. As shown in FIG. 4, the flow includes the following operations.

In S402, a sending technology corresponding to a service to be sent is determined, where the sending technology at least includes a first sending technology and a second sending technology which correspond to different versions of the receiving UE, respectively.

In S404, a sending resource corresponding to the sending technology is determined, and the service to be sent is sent on the determined sending resource.

In an embodiment, an application scenario of the service sending method includes, but not limited to, a V2X service, a wearable service, Machine Type Communication (MTC), Public Safety (PS) communication, the Internet Of Things (IOT), a UE-to-network relay and the like. In the application scenario, the sending technology corresponding to the service to be sent is determined, where the sending technology at least includes the first sending technology and the second sending technology which correspond to different versions of receiving UE, respectively; and the sending resource corresponding to the sending technology is determined, and the service to be sent is sent on the determined sending resource. That is, the service to be sent corresponds to the sending technology, so that the receiving UE may selectively receive the service according to whether the sending technology corresponds to the version of the receiving UE or not, the problem of relatively low service transmission compatibility caused by the fact that UE of different versions may not cooperatively work in the related art is solved, and the technical effect of improving the service transmission compatibility is achieved.

In an embodiment, the execution order of S402 and S404 may be interchanged, namely S404 may be executed prior to the execution of S402.

The embodiment will be described below with an example.

An application layer of UE notifies an access layer of a requirement of a V2X service to be sent, and the access layer of the UE or a base station determines an available sending technology according to the service requirement. For a high-priority V2X service, a low-version compatible sending technology is adopted. Sending version information is indicated in resource configuration information sent by the UE.

Figure 5:
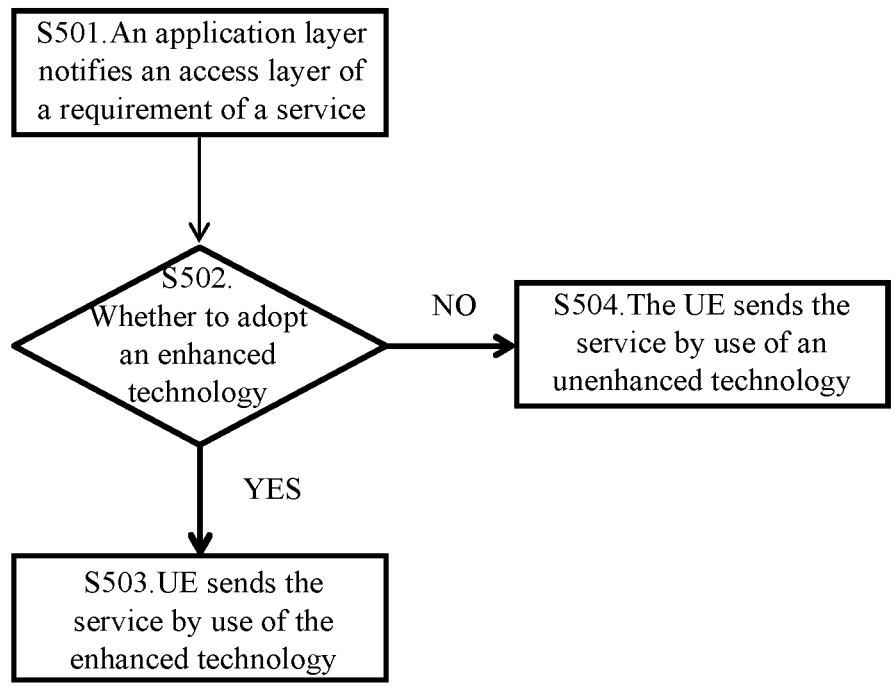
FIG. 5 is a first flowchart of a service sending method according to an exemplary embodiment of the present disclosure.

As shown in FIG. 5, the following operations are included.

In S501, the application layer of the UE indicates requirement information of the V2X service to the access layer.

The UE is sending UE, and the application layer generates the V2X service and sends the V2X service and the requirement information of the V2X service to the access layer through an interface between the application layer and the access layer, the requirement information including one of a PPPP, Prose Per Packet Reliability (PPPR), Quality of Service (QoS) of the service, service traffic, a destination address and the like.

The access layer includes one of layer 1, layer 2 and layer 3, corresponding to a physical layer, a link layer and a Radio Resource Control (RRC) layer, respectively.

In S502, the access layer of the sending UE or the base station judges whether a high-version enhanced technology is required for sending or not, if YES, S503 is executed, otherwise S504 is executed.

If a transmission manner of independently selecting a resource by the sending UE (for example, a mode 4) is adopted, the access layer of the sending UE performs the judgment, and if a transmission manner of scheduling by a base station (for example, a mode 3) is adopted, the base station performs the judgment. For the manner of judging by the base station, the UE indicates the requirement information of the V2X service to the base station through a Uu interface at first. A judgment basis is one of the requirement information of the V2X service, a CBR and a local policy. For the requirement information of the V2X service, for example, if the priority is lower than a specified threshold, and/or the reliability is lower than a specified threshold, and/or the QoS can only be achieved by an enhanced technology, and/or the service (the traffic is relatively high) can only be transmitted through the enhanced technology, and/or UE of the destination address can receive the service sent by the enhanced technology, it is determined that the high-version advancement technology may be adopted, otherwise the high-version advancement technology is not adopted. For the CBR, for example, if a carrier CBR measured by the sending UE is lower than a specified threshold, it is determined that the high-version advancement technology may be adopted, otherwise the high-version advancement technology is not adopted. For the local policy, if a local operating company or a service provider determines to select an enhanced technology, the enhanced technology is adopted for transmission. During a practical application, the basis may be used independently or combined for use, and a corresponding judgment rule is indicated by the base station through RRC signaling or pre-configured in the UE.

For UE uncovered by the base station, whether an enhanced technology may be adopted or not is judged according to a pre-configured rule.

The high-version enhanced technology (called an enhanced technology hereinafter for short) refers to one of the following technologies proposed in an eV2X topic in R15: CA, TxD, resource pooling sharing (mode 3 & mode 4), copy transmission, delay reduction and the like. The technologies are usually not downward compatible, and namely are not supported by Release-14 (R14) UE.

In S503, the sending UE sends the V2X service by use of the enhanced technology, and high-version UE receives the V2X service.

When the sending UE or the base station determines that the enhanced technology may be adopted, the sending UE sends the V2X service by use of the enhanced technology. For the manner of scheduling by a base station, the base station configures a transmission resource and notifies the UE. Considering that only the high-version UE may support the enhanced technology, the high-version UE receives the V2X service, and low-version UE tries to receive but may not correctly receive.

The sending UE indicates the sending version information in the sent resource configuration information, and the version information may be indicated by a reserved byte in existing configuration information. For configuration information of R14 UE, all reserved bytes are 0. For configuration information of R15 UE, a bit b may be adopted, when the bit is 1, it is indicated that the sending UE adopts an R15 enhanced technology, and b=0 indicates that the sending UE adopts an R14 technology. Furthermore, only R15 UE may recognize b=1, so that b may also be adopted to distinguish the sending manner. For example, b=1 indicates that the R15 UE adopts the manner of scheduling by a base station, and b=0 indicates another resource configuration manner (including one of a manner of independent selection by the UE in R15, a manner of scheduling by a base station in R14 and a manner of independent selection by the UE in R14). When the R15 UE independently selects a resource, resources corresponding to b=1 are excluded.

In S504, the sending UE sends the V2X service by use of an unenhanced technology, and adjacent UE receives the V2X service.

When the UE or the base station determines that the enhanced technology may not be adopted, the sending UE sends the V2X service by use of a low-version technology, and the adjacent UE (consistent with the destination address) receives the service. The adjacent UE includes high-version and low-version UE.

It is to be pointed out that, in a scenario that UEs of different versions share a resource pool, for ensuring that the base station schedules resources, it is necessary to reserve part of resources dedicated to the manner of scheduling by a base station, the reserved resources may be indicated through broadcast signaling of the base station, and sending UE that independently selects a resource, after receiving the indication information, excludes the reserved resources during resource selection. For the shared resource pool, the sending UE, when independently selecting the resource, selects the resource according to a sensing and resource selection/reservation flow in R14 and performs resource reselection according to an R14 reselection rule. If the R15 high-version UE adopts the manner of scheduling by a base station, for semi-persistent scheduling, a semi-persistent scheduling period may be indicated in the resource configuration information.

The shared resource pool includes time-domain and frequency-domain resource information. A time-domain resource takes subframe as a unit, and a frequency-domain resource takes Resource Block (RB) or sub channel as a unit, the sub channel being multiple continuous RBs. The shared resource pool may be configured for a Physical Sidelink Control Channel (PSCCH) and/or a Physical Sidelink Shared Channel (PSSCH).

The eNB indicates a shared resource pool configuration parameter of PC5 through a System Information Block (SIB) or dedicated RRC signaling.

PC5 communication includes co-frequency or inter-frequency communication. Co-frequency refers to that a frequency is shared by Uu and PC5 communication. Inter-frequency refers to that a dedicated frequency such as a 5.9 GHz V2X frequency, is adopted for PC5 communication.

PC5 refers to an interface between UE and may also be represented by another name (for example, sidelink). A wireless transmission technology such as a licensed spectrum Prose technology, a Wireless Local Area Network (WLAN)/Wireless Fidelity (WiFi) (for example, 802.11 series), Bluetooth or infrared may be adopted for the PC5 interface.

In an implementation mode, the operation that the sending technology corresponding to the service to be sent is determined includes that: the sending technology corresponding to the service to be sent is determined according to at least one of the following information: service requirement information of the service to be sent, a CBR of a channel presently configured for sending the service to be sent, a local policy, a pre-configured rule and a version of sending UE and/or the receiving UE.

In an embodiment, the service requirement information of the service to be sent is notified to an access layer of the sending UE by an application layer of the sending UE, and the access layer of the sending UE or a base station determines the sending technology corresponding to the service to be sent.

In an embodiment, when the service to be sent is a high-priority service, the sending technology is a backward compatible sending technology; and when UEs adopting different sending technologies share a resource pool, part of resources in the shared resource pool are reserved for scheduling by a base station.

In an implementation mode, before the service to be sent is sent on the determined sending resource or at the same time when the service to be sent is sent on the determined sending resource, the method further includes the following operation.

In S11, version indication information is sent, where the version indication information is used for instructing UE of a same version indicated by the version indication information to receive the service to be sent, and the version indication information at least includes first version indication information and second version indication information.

In an embodiment, the operation that the version indication information is sent includes the following operations.

In S21, the version indication information is determined.

In S22, a value of a preset byte in specified information is set to correspond to a content indicated by the version indication information.

In S23, the specified information is sent.

In an implementation mode, the sending resource corresponding to the sending technology is determined in, but not limited to, at least one of the following manners: scheduling, at a base station, the sending resource; and independently selecting, at sending UE, the sending resource.

The operation that the base station schedules the sending resource includes that: the sending resource corresponding to the sending technology is determined according to signaling transmitted by the base station, where the signaling is used for indicating that, under a condition that there is a reserved resource pool, the base station selects the sending resource corresponding to the sending technology for the UE from the reserved resource pool and, under a condition that there is no reserved resource pool, the base station schedules a shared resource pool as the sending resource selected for the UE and corresponding to the sending technology.

Figure 6:
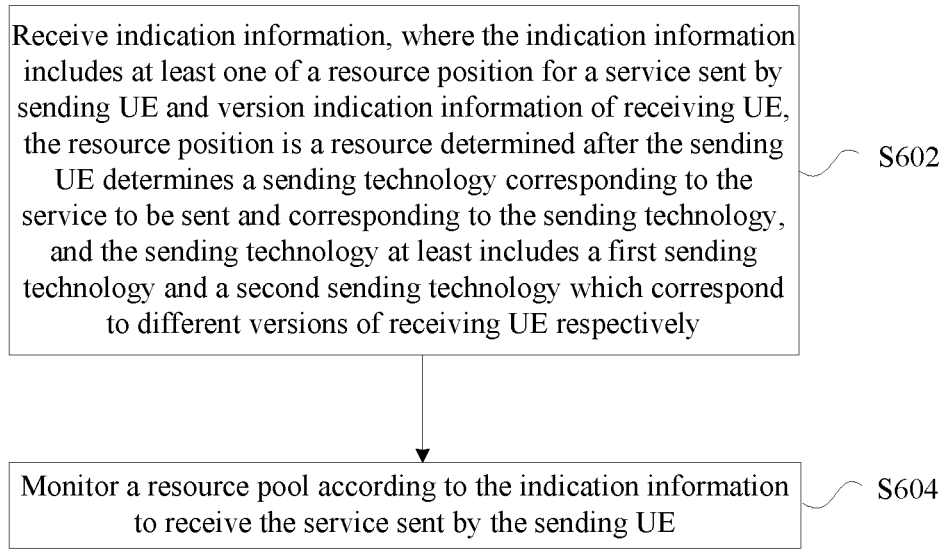
FIG. 6 is a flowchart of a service receiving method according to an embodiment of the present disclosure.

The embodiments also provide a service receiving method implemented in the abovementioned mobile terminal. FIG. 6 is a flowchart of a service receiving method according to an embodiment of the present disclosure. As shown in FIG. 6, the flow includes the following operations.

In S602, indication information is received, where the indication information includes at least one of a resource position for a service sent by sending UE and version indication information of receiving UE, the resource position is a resource determined after the sending UE determines a sending technology corresponding to the service to be sent, the resource corresponds to the sending technology, and the sending technology at least includes a first sending technology and a second sending technology which correspond to different versions of the receiving UE, respectively.

In S604, a resource pool is monitored according to the indication information to receive the service sent by the sending UE.

In an embodiment, an application scenario of the service receiving method includes, but not limited to, a V2X service, a wearable service, MTC, PS communication, IOT, a UE-to-network relay and the like. In the application scenario, the indication information is received, where the indication information includes at least one of the resource position for the service sent by the sending UE and the version indication information of the receiving UE, the resource position is the resource determined after the sending UE determines the sending technology corresponding to the service to be sent, the resource corresponds to the sending technology, and the sending technology at least includes the first sending technology and the second sending technology which correspond to different versions of the receiving UE, respectively; and the resource pool is monitored according to the indication information to receive the service sent by the sending UE. That is, the receiving UE monitors the resource pool according to the indication information sent by the sending UE and selectively receives the service, so that the problem of relatively low service transmission compatibility caused by the fact that UE of different versions may not cooperatively work in the related art is solved, and the technical effect of improving the service transmission compatibility is achieved.

In an embodiment, the execution order of S602 and S604 may be interchanged, namely S604 may be executed prior to the execution of S602.

The embodiment of the present disclosure will be described below with an example.

Descriptions are made with sending of UE adopting a mode 3 as an example.

Figure 7:
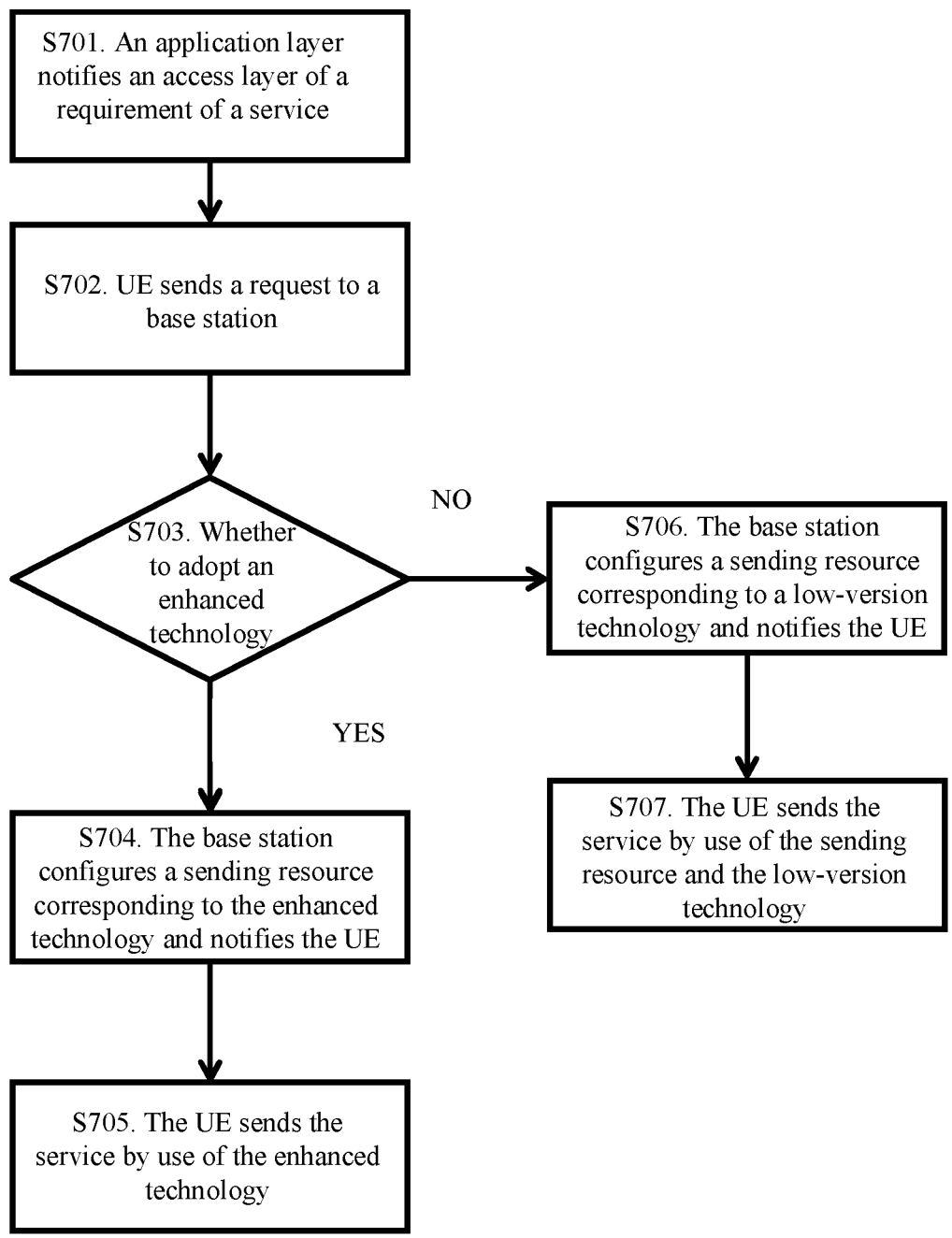
FIG. 7 is a second flowchart of a service sending method according to an exemplary embodiment of the present disclosure.

A method for sending a service by sending UE in the mode 3 is provided in the example. As shown in FIG. 7, the following operations are included.

In S701, an application layer of the sending UE indicates requirement information of a V2X service to an access layer.

It is to be noted that S701 is the same as S501 and will not be elaborated herein.

In S702, the UE sends a request message to a base station.

The UE sends the request message to the base station through RRC signaling or MAC Control Element (CE) signaling. The request message is used for requesting for a PC5 resource sending the V2X service. The request message includes a service identifier and service traffic, and further includes one of a carrier frequency corresponding to the service, a PPPP, PPPR, QoS, a destination address and the like.

In S703, the base station determines a sending technology adopted by the UE, if an enhanced technology is adopted, S704 is executed, otherwise S706 is executed.

The base station determines the sending technology according to one of the request message sent by the UE, a CBR and a local policy. The sending technology includes one of the enhanced technology and an unenhanced technology. The enhanced technology refers to new technologies in R15, for example, one or more of CA, TxD, resource pool sharing, copy transmission and delay reduction. The enhanced technology refers to an existing technology before R15 or a technology adopted by R14 UE.

In S704, the base station configures a sending resource corresponding to the enhanced technology and notifies the UE.

When the base station determines that the UE adopts the enhanced technology, the base station selects the sending resource according to a requirement of the enhanced technology, and the base station notifies the enhanced technology required to be adopted and the required resource to the UE through RRC signaling.

In S705, the sending UE sends the service by use of the sending resource and the enhanced technology.

The sending UE sends the V2X service by use of the enhanced technology and the sending resource, the service may be received by R15 UE, and R14 UE may try to receive but may fail.

In S706, the base station configures a sending resource corresponding to a low-version technology and notifies the UE.

When the base station determines not to adopt the enhanced technology, the required resource is selected and notified to the UE through the RRC signaling.

It is to be pointed out that, for a high-priority service, for example, a Cooperative Awareness Message (CAM)/Decentralized Environmental Notification Message (DENM), a service required to be received by all adjacent UE can only be sent by use of a low-version (R14) existing technology, and this is because the service can be normally received by both high-version (R15) and low-version (R14) UE only when being sent by use of the low-version technology. The high priority is usually determined by a preset threshold, for example, a preset PPPP value, and the service is sent by use of the low-version technology only when a PPPP requirement of the service is lower than the preset PPPP value.

In S707, the sending UE sends the service by use of the sending resource and the low-version technology.

The sending UE sends the V2X service.

In an embodiment, descriptions are made mainly with sending in mode 4 in coverage as an example.

Figure 8:
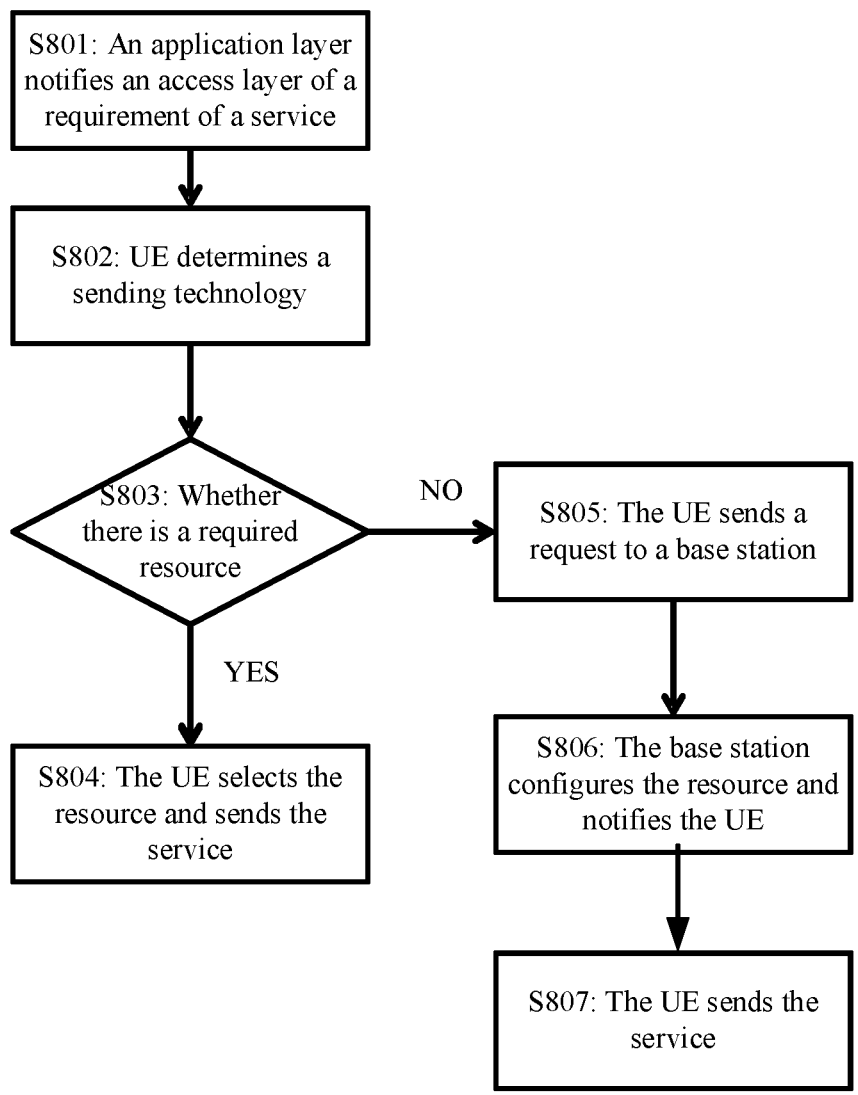
FIG. 8 is a third flowchart of a service sending method according to an exemplary embodiment of the present disclosure.

The embodiments of the present disclosure provide a method for independently selecting a resource by sending UE in coverage. As shown in FIG. 8, the following operations are included.

In S801, an application layer of the UE indicates a requirement of a V2X service to an access layer.

It is to be noted that S801 is similar to S501 and will not be elaborated herein.

In S802, the UE determines a sending technology version.

The UE determines a sending technology according to one of the requirement of the V2X service, a CBR and a local policy. The technology version includes one of an R15 enhanced technology or an R14 technology.

In S803, the UE judges whether there is a required sending resource or not, if YES, S804 is executed, otherwise S805 is executed.

The UE judges whether there is the required sending resource or not according to a resource required by the selected technology version and the CBR. For example, if the CBR of the required resource is higher than a preset threshold, the required resource cannot be acquired, otherwise the required resource can be acquired.

In S804, the UE selects a resource and sends the service.

The UE, when determining that the required resource can be acquired, sends the service on the acquired resource.

In S805, the UE sends a resource request to a base station.

The UE, when determining that the required resource cannot be acquired, sends a request message to the base station, the request message including a service identifier and service traffic and further including one of the sending technology, a carrier frequency corresponding to the service, a PPPP, PPPR, QoS, a destination address and the like.

In S806, the base station configures the sending resource and notifies the UE.

The base station determines the sending resource according to one of the request message sent by the UE, the CBR and a local policy. If the base station can configure the resource required by the technology selected by the UE, the required resource is configured and notified to the UE through RRC signaling, otherwise the base station selects another technology and resource suitable for sending the V2X service and notifies the UE.

In S807, the sending UE sends the service.

The sending UE sends the service on the received resource.

In an embodiment, descriptions are made mainly with sending in mode 4 outside coverage as an example.

Figure 9:
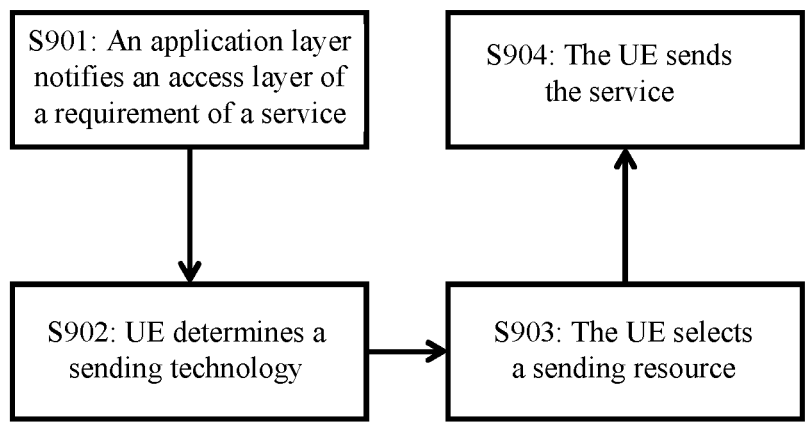
FIG. 9 is a fourth flowchart of a service sending method according to an exemplary embodiment of the present disclosure.

The embodiments of the present disclosure provide a method for sending a service by UE outside coverage. As shown in FIG. 9, the following operations are included.

In S901, an application layer indicates a requirement of a V2X service to an access layer.

In S902, the UE determines a sending technology.

The UE determines the sending technology according to one of a pre-configured rule and the service requirement. The pre-configured rule is configured in advance and saved in the UE. For example, when a service priority is higher than a preset threshold, an R14 technology is adopted for sending, and/or, when a CBR is lower than a specific threshold, an R15 technology is adopted for sending.

In S903, the UE selects a sending resource.

The UE selects the required sending resource according to the determined sending technology. During practical implementation, the UE may select the required resource by a resource sending and resource selection flow in R14.

In S904, the sending UE sends the service.

In an embodiment, descriptions are made mainly with the condition that resource pools of different versions are not shared as an example.

Figure 10:
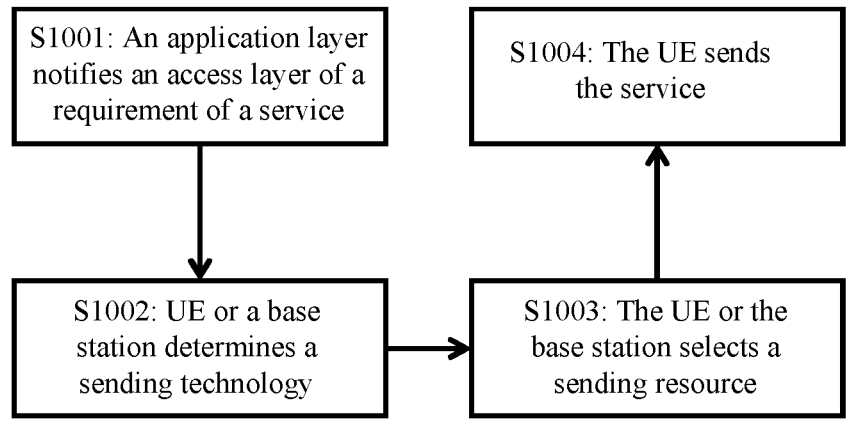
FIG. 10 is a fifth flowchart of a service sending method according to an exemplary embodiment of the present disclosure.

The embodiments of the present disclosure provide a V2X service sending method. As shown in FIG. 10, the following operations are included.

In S1001, an application layer indicates a requirement of a V2X service to an access layer.

In S1002, a base station or sending UE determines a sending technology.

In S1003, the base station or the sending UE selects a sending resource according to the determined sending technology.

Considering that resources of different versions are not shared, namely R15 and R14 resources are mutually orthogonal, for the determined sending technology, the required resource is selected from a corresponding resource pool, respectively.

In S1004, the sending UE sends the service.

The sending UE sends the service on the selected resource. Since the resources of different versions are not shared, receiving UE is only required to monitor the resource pool of a version corresponding to the receiving UE. For example, R14 UE is only required to monitor an R14 resource pool, and R15 UE monitors the corresponding resource pool according to a receiving capability and a preset rule. For example, a high-priority service may be sent on the R14 resource pool only, and the R15 UE is required to monitor the R14 resource pool. If the number of receiving modules of the R15 UE is smaller than the number of resource pools required to be monitored, the required resource pools may be monitored in a time division manner.

In an embodiment, descriptions are made mainly with the condition that resource pools of different versions are shared as an example.

Figure 11:
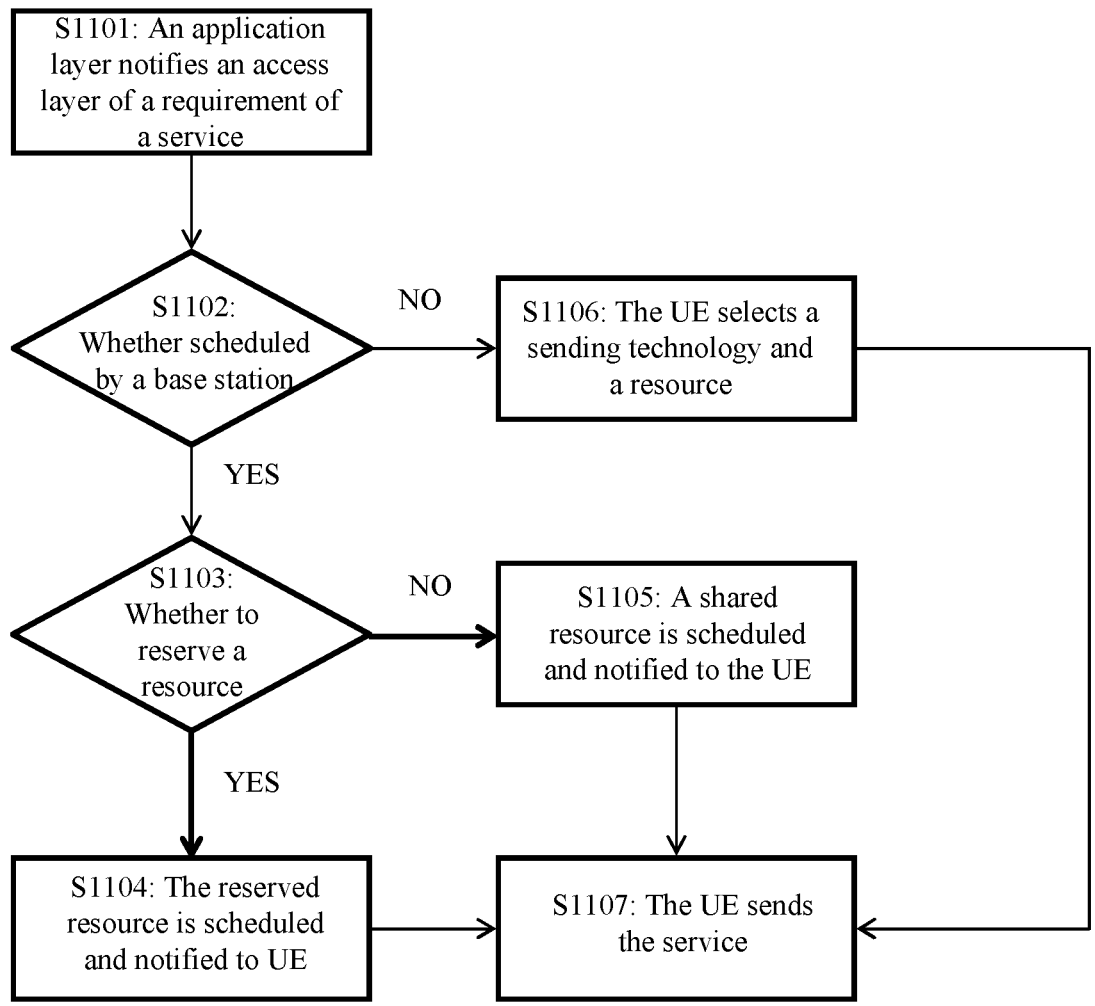
FIG. 11 is a sixth flowchart of a service sending method according to an exemplary embodiment of the present disclosure.

The embodiments of the present disclosure provide a V2X service sending method. As shown in FIG. 11, the following operations are mainly included.

In S1101, an application layer indicates a requirement of a V2X service to an access layer.

In S1102, a resource configuration manner for sending the service is determined, if the manner is scheduling by a base station, S1103 is executed, otherwise S1106 is executed.

The resource configuration manner includes one of scheduling by a base station and independent selection by the UE. Determination is completed by one of the base station and a local policy. For example, the base station determines the resource configuration manner according to the service requirement and a network load, or a local operating company or a service provider determines the resource configuration manner.

In S1103, a base station judges whether there is a reserved resource pool or not, if YES, S1104 is executed, otherwise S1105 is executed.

The base station checks whether there is a resource pool reserved for a mode 3 or not. Scheduling by a base station (the mode 3) may ensure QoS of the service and therefore is usually adopted for a high-priority service. Therefore, a part of resources is reserved for scheduling by a base station, and UE adopting a mode 4 may not select the reserved resource pool. A size of the reserved resource pool is configured by the base station and regulated according to a CBR. For example, if a CBR of a shared resource pool or a resource pool for the mode 4 is higher than a preset threshold, the base station reduces the reserved resource pool and expands the shared resource pool or the resource pool for the mode 4. Configuration information of the reserved resource pool is notified to the UE by the base station through RRC signaling, for example, notified to the UE through a system broadcast message.

In S1104, the base station selects a resource from the reserved resource pool and notifies the UE, and S1107 is executed.

In S1105, the base station selects the resource from a shared resource pool and notifies the UE.

If there is no reserved resource pool, the base station selects the resource from the shared resource pool and notifies the UE.

In S1106, the UE selects a sending technology and the resource.

The sending UE independently selects the sending technology and the resource.

In S1107, the sending UE sends the V2X service.

Sending UE under the manner of scheduling by a base station may indicate a period value for semi-persistent scheduling in configuration information, so that independent selection UE, when sensing and selecting a resource, may exclude corresponding resources according to the indicated period value, thereby reducing possible conflicts during independent resource selection.

In an embodiment, descriptions are made mainly with V2X service reception of receiving UE as an example.

Figure 12:
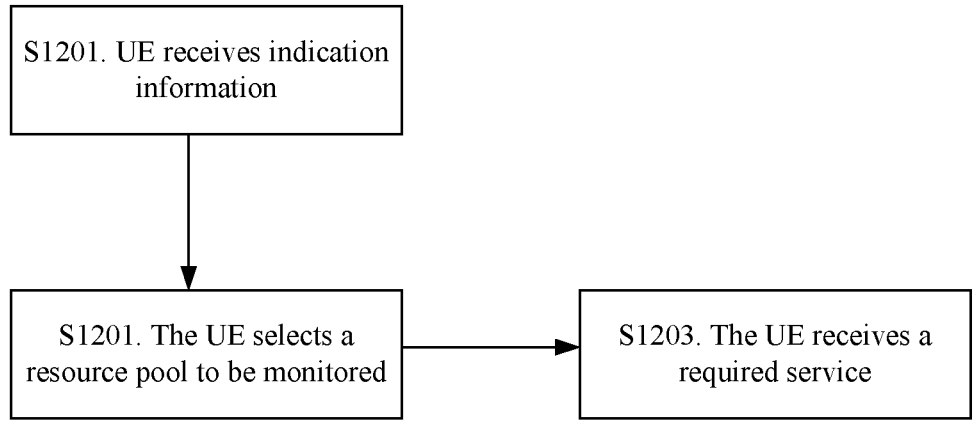
FIG. 12 is a flowchart of a service receiving method according to an exemplary embodiment of the present disclosure.

As shown in FIG. 12, the following operations are included.

In S1201, receiving UE receives indication information.

The indication information includes one of information broadcast by a base station at a Uu interface, information broadcast by adjacent UE at PC5 and pre-configuration information. The indication information is configured to indicate one of a sending resource pool, a resource pool reserved for a mode 3, a shared resource pool, a threshold value and a sending technology version. The threshold value includes one of a priority threshold, a reliability threshold and a CBR threshold. The sending technology version includes one of R15 and R14.

In S1202, the UE selects a resource pool to be monitored.

The UE selects the resource pool to be monitored according to the indication information and its own capability.

In S1203, the receiving UE receives a required service.

Through the exemplary embodiments, the base station or the sending UE selects the sending technology and sending resource for the V2X service, UE of different versions may cooperatively work, and the backward compatibility of V2X service transmission is improved.

Through the above descriptions about the implementation modes, those skilled in the art may clearly know that the methods according to the embodiment may be implemented in a manner of combining software and a required universal hardware platform and, of course, may also be implemented through hardware, but the former is a preferred implementation mode under many circumstances. Based on such an understanding, the technical solutions of the present disclosure substantially or parts making contributions to a conventional art may be embodied in form of a software product. The computer software product is stored in a storage medium (for example, a Read-Only Memory (ROM)/RAM, a magnetic disk and an optical disk), including a plurality of instructions configured to enable a terminal device (which may be a mobile phone, a computer, a server, a network device or the like) to execute the method of each embodiment of the present disclosure.

The embodiments of the present disclosure also provide a service sending device, which is configured to implement the abovementioned embodiment. What has been described will not be elaborated. For example, term "module" used below may be a combination of software and/or hardware capable of realizing a preset function. Although the devices described in the following embodiment are preferably implemented with software, implementation with hardware or a combination of the software and the hardware is also possible and conceivable.

Figure 13:
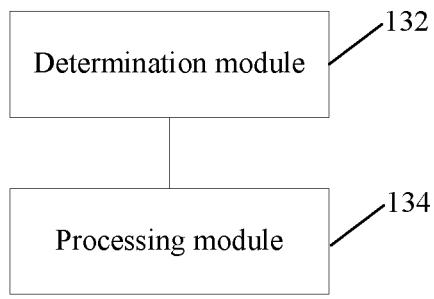
FIG. 13 is a structure block diagram of a service sending device according to an embodiment of the present disclosure.

FIG. 13 is a structure block diagram of a service sending device according to an embodiment of the present disclosure. As shown in FIG. 13, the device includes:

a determination module 132, configured to determine a sending technology corresponding to a service to be sent, where the sending technology at least includes a first sending technology and a second sending technology which correspond to different versions of the receiving UE, respectively; and a processing module 134, configured to determine a sending resource corresponding to the sending technology and send the service to be sent on the determined sending resource.

In an embodiment, an application scenario of the service sending device includes, but not limited to, a V2X service, a wearable service, MTC, PS communication, the TOT, a UE-to-network relay and the like. In the application scenario, the sending technology corresponding to the service to be sent is determined, where the sending technology at least includes the first sending technology and the second sending technology which correspond to different versions of receiving UE, respectively; and the sending resource corresponding to the sending technology is determined, and the service to be sent is sent on the determined sending resource. That is, the service to be sent corresponds to the sending technology, so that the receiving UE may selectively receive the service according to whether the sending technology corresponds to the version of the receiving UE or not, the problem of relatively low service transmission compatibility caused by the fact that UE of different versions may not cooperatively work in the related art is solved, and the technical effect of improving the service transmission compatibility is achieved.

In an implementation mode, the determination module 132 is further configured to determine the sending technology corresponding to the service to be sent according to at least one of the following information: service requirement information of the service to be sent, a CBR of a channel presently configured for sending the service to be sent, a local policy, a pre-configured rule and a version of sending UE and/or the receiving UE.

In an embodiment, the service requirement information of the service to be sent is notified to an access layer of the sending UE by an application layer of the sending UE, and the access layer of the sending UE or a base station determines the sending technology corresponding to the service to be sent.

In an embodiment, when the service to be sent is a high-priority service, the sending technology is a backward compatible sending technology; and when UEs adopting different sending technologies share a resource pool, part of resources in the shared resource pool are reserved for scheduling by a base station.

Figure 14:
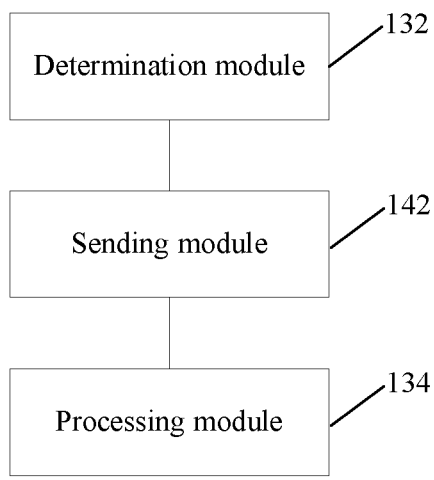
FIG. 14 is a first structure block diagram of a service sending device according to an embodiment of the present disclosure.

In an implementation mode, FIG. 14 is a first structure block diagram of a service sending device according to an embodiment of the present disclosure. As shown in FIG. 14, besides all the modules shown in FIG. 13, the device further includes:

a sending module 142, configured to, before the service to be sent is sent on the determined sending resource or at the same time when the service to be sent is sent on the determined sending resource, send version indication information, where the version indication information is used for instructing UE of a same version indicated by the version indication information to receive the service to be sent, and the version indication information at least includes first version indication information and second version indication information.

Figure 15:
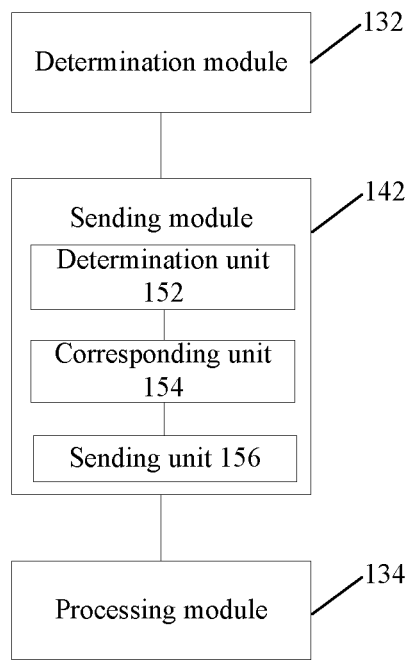
FIG. 15 is a second structure block diagram of a service sending device according to an embodiment of the present disclosure.

FIG. 15 is a second structure block diagram of a service sending device according to an embodiment of the present disclosure. As shown in FIG. 15, the sending module 142 includes:

a determination unit 152, configured to determine the version indication information;

a corresponding unit 154, configured to set a value of a preset byte in specified information to correspond to a content indicated by the version indication information; and a sending unit 156, configured to send the specified information.

In an implementation mode, the determination module 132 is further configured to determine the sending resource corresponding to the sending technology in at least one of the following manners: scheduling, at a base station, the sending resource; and independently selecting, at sending UE, the sending resource.

In an embodiment, when the manner is scheduling, at the base station, the sending resource, the determination module 132 is further configured to determine the sending resource corresponding to the sending technology according to signaling transmitted by the base station, where the signaling is used for indicating that, under a condition that there is a reserved resource pool, the base station selects the sending resource corresponding to the sending technology for the UE from the reserved resource pool and, under a condition that there is no reserved resource pool, the base station schedules a shared resource pool as the sending resource selected for the UE and corresponding to the sending technology.

The embodiments further provide a service receiving device, which is configured to implement the abovementioned embodiments and preferred implementation modes. What has been described will not be elaborated. For example, term "module" used below may be a combination of software and/or hardware capable of realizing a preset function. Although the devices described in the following embodiment are preferably implemented with software, implementation with hardware or a combination of the software and the hardware is also possible and conceivable.

Figure 16:
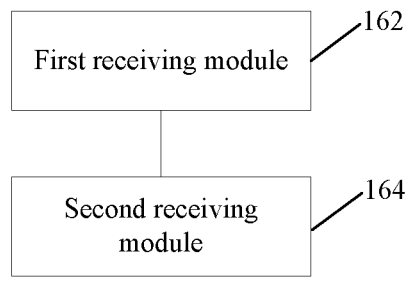
FIG. 16 is a structure block diagram of a service receiving device according to an embodiment of the present disclosure.

FIG. 16 is a structure block diagram of a service receiving device according to an embodiment of the present disclosure. As shown in FIG. 16, the device includes:

a first receiving module 162, configured to receive indication information, where the indication information includes at least one of a resource position for a service sent by sending UE and version indication information of receiving UE, the resource position is a resource determined after the sending UE determines a sending technology corresponding to the service to be sent, the resource corresponds to the sending technology, and the sending technology at least includes a first sending technology and a second sending technology which correspond to different versions of the receiving UE, respectively; and a second receiving module 164, configured to monitor a resource pool according to the indication information to receive the service sent by the sending UE.

In an embodiment, an application scenario of the service receiving device includes, but not limited to, a V2X service, a wearable service, MTC, PS communication, the TOT, a UE-to-network relay and the like. In the application scenario, the indication information is received, where the indication information includes at least one of the resource position for the service sent by the sending UE and the version indication information of the receiving UE, the resource position is the resource determined after the sending UE determines the sending technology corresponding to the service to be sent, the resource corresponds to the sending technology, and the sending technology at least includes the first sending technology and the second sending technology which correspond to different versions of the receiving UE, respectively; and the resource pool is monitored according to the indication information to receive the service sent by the sending UE. That is, the receiving UE monitors the resource pool according to the indication information sent by the sending UE and selectively receives the service, so that the problem of relatively low service transmission compatibility caused by the fact that UE of different versions may not cooperatively work in the related art is solved, and the technical effect of improving the service transmission compatibility is achieved.

The embodiment of the present disclosure will be described below with an example.

The device in the example includes a terminal device and an access network device. The terminal device of the present disclosure includes at least one of an On Board Unit (OBU), an RSU, UE, V-UE, P-UE, a wearable, a UE-to-network relay and an IOT/MTC terminal (unless otherwise specified, UE mentioned in the present disclosure represents one or more of the above terminal devices). An application layer of the terminal device notifies an access layer of a requirement of a service to be sent, and the access layer of the terminal device determines an available sending technology according to the service requirement. For a high-priority V2X service, the terminal device adopts a low-version compatible sending technology. The terminal device sends service requirement indication information to a base station.

The access network device at least includes the base station. The base station is mainly responsible for receiving the service requirement indication information sent by the terminal device and determining the available sending technology. For the high-priority V2X service, the access network device adopts the low-version compatible sending technology.

It is to be noted that each module may be implemented through software or hardware and, under the latter condition, may be implemented in, but not limited to, the following manner: the modules are all positioned in the same processor, or the modules are positioned in different processors in any combination form, respectively.

Figure 17:
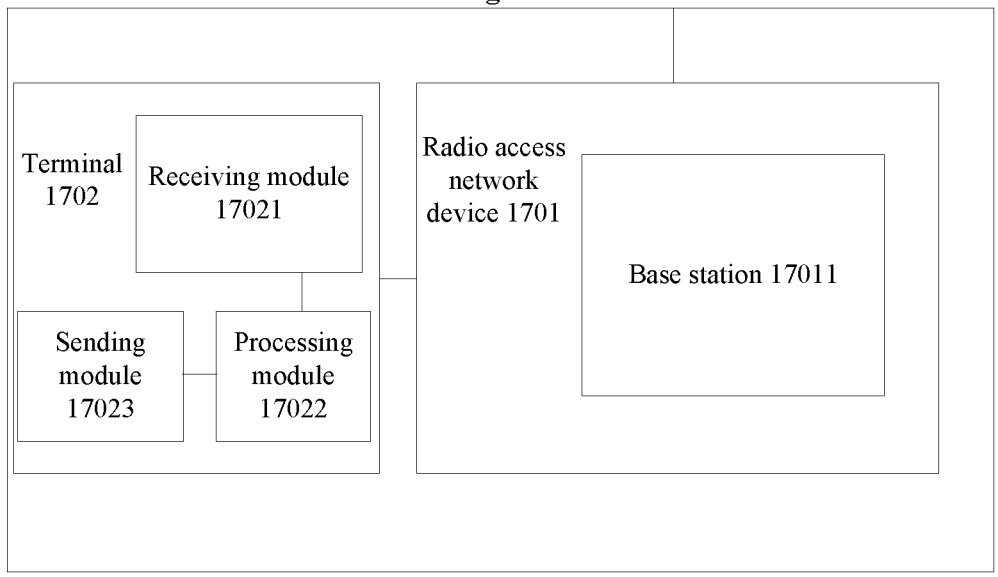
FIG. 17 is a structure block diagram of a V2X service transmission system according to an exemplary embodiment of the present disclosure.

The embodiments of the present disclosure also provide a V2X service transmission system. As shown in FIG. 17, the system includes a radio access network device 1701 and a terminal 1702. The radio access network device 1701 includes a base station 17011. The terminal 1702 includes a receiving module 17021 of the terminal, a processing module 17022 and a sending module 17023. The receiving module 17021 of the terminal is configured to receive configuration information sent by the base station 17011 and service requirement information sent by an application layer. The processing module 17022 of the terminal 1702 is configured to determine a sending technology and a resource. The sending module 17023 of the terminal 1702 is configured to send a request message to the base station and send a V2X service at PC5 by use of the configured resource. The base station 17011 is configured to send the configuration information to the terminal 1702 and receive the request message reported by the UE, and is further configured to regulate a reserved resource pool.

The embodiments of the present disclosure also provide a storage medium, in which a computer program is stored, the computer program, when being executed, performs the operations of the method provided in the embodiments of the present disclosure.

In an embodiment, the storage medium may be configured to store a computer program configured to execute the following operations.

In S1, a sending technology corresponding to a service to be sent is determined, where the sending technology at least includes a first sending technology and a second sending technology which correspond to different versions of receiving UE, respectively.

In S2, a sending resource corresponding to the sending technology is determined, and the service to be sent is sent on the determined sending resource.

In an embodiment, the storage medium is further configured to store a computer program configured to execute the following operations.

In S1, indication information is received, where the indication information includes at least one of a resource position for a service sent by sending UE and version indication information of receiving UE, the resource position is a resource determined after the sending UE determines a sending technology corresponding to the service to be sent, the resource corresponds to the sending technology, and the sending technology at least includes a first sending technology and a second sending technology which correspond to different versions of the receiving UE, respectively.

In S2, a resource pool is monitored according to the indication information to receive the service sent by the sending UE.

In an embodiment, the storage medium in the embodiment may include, but not limited to, various medium capable of storing computer programs such as a U disk, a ROM, a RAM, a mobile hard disk, a magnetic disk or an optical disk.

The embodiments of the present disclosure also provide an electronic device, which includes a memory and a processor. A computer program is stored in the memory. The processor is configured to execute the computer program to perform the operations of the method in any the embodiments of the present disclosure.

In an embodiment, the electronic device may further include a transmission device and an input/output device. The transmission device is connected with the processor, and the input/output device is connected with the processor.

In an embodiment, the processor in the embodiment may be configured to execute the following operations through the computer program.

In S1, a sending technology corresponding to a service to be sent is determined, where the sending technology at least includes a first sending technology and a second sending technology which correspond to different versions of the receiving UE, respectively.

In S2, a sending resource corresponding to the sending technology is determined, and the service to be sent is sent on the determined sending resource.

In an embodiment, the processor is further configured to store a computer program configured to execute the following operations.

In S1, indication information is received, where the indication information includes at least one of a resource position for a service sent by sending UE and version indication information of receiving UE, the resource position is a resource determined after the sending UE determines a sending technology corresponding to the service to be sent, the resource corresponds to the sending technology, and the sending technology at least includes a first sending technology and a second sending technology which correspond to different versions of the receiving UE, respectively.

In S2, a resource pool is monitored according to the indication information to receive the service sent by the sending UE.

It is apparent that those skilled in the art should know that each module or each operation of the present disclosure may be implemented through a universal computing device. They may be concentrated in a single computing device or distributed in a network formed by multiple computing devices. In an embodiment, they may be implemented by program codes executable for the computing devices and thus may be stored in a storage device for execution with the computing devices. Moreover, in some cases, the shown or described operations may be executed in sequences different from those described here, or may form various integrated circuit modules, respectively, or multiple modules or operations therein may form a single integrated circuit module for implementation. Therefore, the present disclosure is not limited to any specific hardware and software combination.

The above is only the preferred embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection of the present disclosure.

What is claimed is:

1. A service sending method, comprising:
   determining a sending technology corresponding to a service to be sent, wherein the sending technology at least comprises a first sending technology and a second sending technology which correspond to different versions of receiving User Equipment (UE), respectively; and
   determining a sending resource corresponding to the sending technology, and sending the service to be sent on the determined sending resource;
   wherein the sending resource corresponding to the sending technology is determined in at least one of following manners: scheduling, by a base station, the sending resource; and independently selecting, by sending UE, the sending resource; and
   scheduling, by the base station, the sending resource comprises:
   determining the sending resource corresponding to the sending technology according to signaling transmitted by the base station,
   wherein the signaling is used for indicating that, under a condition that there is a reserved resource pool, the base station selects the sending resource corresponding to the sending technology for the UE from the reserved resource pool and, under a condition that there is no reserved resource pool, the base station schedules a shared resource pool as the sending resource selected for the UE and corresponding to the sending technology.

2. The method as claimed in claim 1, wherein determining the sending technology corresponding to the service to be sent comprises:
   determining the sending technology corresponding to the service to be sent according to at least one of following information:
   service requirement information of the service to be sent, a Channel Busy Ratio (CBR) of a channel presently configured for sending the service to be sent, a local policy, a pre-configured rule and a version of sending UE and/or the receiving UE.

3. The method as claimed in claim 2, wherein the service requirement information of the service to be sent is notified to an access layer of the sending UE by an application layer of the sending UE, and the access layer of the sending UE or a base station determines the sending technology corresponding to the service to be sent.

4. The method as claimed in claim 1, wherein
   when the service to be sent is a high-priority service, the sending technology is a backward compatible sending technology.

5. The method as claimed in claim 1, wherein
   when UEs adopting different sending technologies share a resource pool, part of resources in the shared resource pool are reserved for scheduling by a base station.

6. The method as claimed in claim 1, before sending the service to be sent on the determined sending resource or at the same time of sending the service to be sent on the determined sending resource, further comprising:
   sending version indication information, wherein the version indication information is used for instructing UE of a same version indicated by the version indication information to receive the service to be sent, and the version indication information at least comprises first version indication information and second version indication information.

7. The method as claimed in claim 6, wherein sending the version indication information comprises:
   determining the version indication information;
   setting a value of a preset byte in specified information to correspond to a content indicated by the version indication information; and
   sending the specified information.

8. A service sending device, applied to a sender and comprising a processor configured to execute following program modules:
   a determination module, configured to determine a sending technology corresponding to a service to be sent, wherein the sending technology at least comprises a first sending technology and a second sending technology which correspond to different versions of receiving User Equipment (UE), respectively; and
   a processing module, configured to determine a sending resource corresponding to the sending technology and send the service to be sent on the determined sending resource;
   wherein the processing module is configured to determine the sending resource corresponding to the sending technology in at least one of following manners: scheduling, at a base station, the sending resource; and independently selecting, at sending UE, the sending resource; and
   when the manner is scheduling, at the base station, the sending resource, the processing module is configured to determine the sending resource corresponding to the sending technology according to signaling transmitted by the base station, wherein the signaling is used for indicating that, under a condition that there is a reserved resource pool, the base station selects the sending resource corresponding to the sending technology for the UE from the reserved resource pool and, under a condition that there is no reserved resource pool, the base station schedules a shared resource pool as the sending resource selected for the UE and corresponding to the sending technology.

9. The device as claimed in claim 8, wherein the determination module is further configured to determine the sending technology corresponding to the service to be sent according to at least one of following information:
   service requirement information of the service to be sent, a Channel Busy Ratio (CBR) of a channel presently configured for sending the service to be sent, a local policy, a pre-configured rule and a version of sending UE and/or the receiving UE.

10. The device as claimed in claim 8, further comprising:
    a sending module, configured to, before the service to be sent is sent on the determined sending resource or at the same time when the service to be sent is sent on the determined sending resource, send version indication information, wherein the version indication information is used for instructing UE of a same version indicated by the version indication information to receive the service to be sent, and the version indication information at least comprises first version indication information and second version indication information.

11. The device as claimed in claim 10, wherein the sending module comprises:
    a determination unit, configured to determine the version indication information;

a corresponding unit, configured to set a value of a preset byte in specified information to correspond to a content indicated by the version indication information; and a sending unit, configured to send the specified information.

12. A non-transitory storage medium, in which a computer program is stored, the computer program, when being executed by a processor, causes the processor to perform the service sending method as claimed in claim 1.

13. An electronic device, comprising a memory and a processor, wherein a computer program is stored in the memory; and the processor is configured to execute the computer program to perform the service sending method as claimed in claim 1.

\* \* \* \* \*